United States Patent
Kullin

(10) Patent No.: US 10,808,760 B2
(45) Date of Patent: Oct. 20, 2020

(54) ASSEMBLY FOR A ROLLING ELEMENT BEARING

(71) Applicant: Aktiebolaget SKF, Gothenburg (SE)

(72) Inventor: Arne Lars Jonas Kullin, Landvetter (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/032,203

(22) Filed: Jul. 11, 2018

(65) Prior Publication Data

US 2019/0107148 A1 Apr. 11, 2019

(30) Foreign Application Priority Data

Oct. 6, 2017 (DE) .......... 10 2017 217 810

(51) Int. Cl.
*F16C 33/50* (2006.01)
*F16C 43/06* (2006.01)
*F16C 33/38* (2006.01)

(52) U.S. Cl.
CPC .......... *F16C 33/50* (2013.01); *F16C 33/3812* (2013.01); *F16C 43/065* (2013.01); *F16C 2226/62* (2013.01); *F16C 2226/70* (2013.01); *F16C 2300/02* (2013.01)

(58) Field of Classification Search
CPC .......... F16C 33/50–508; F16C 33/3812; F16C 2226/62; F16C 2226/70–2226/78; F16C 43/065; F16C 2300/02
See application file for complete search history.

(56) References Cited

U.S. PATENT DOCUMENTS

| 861,870 | A | * | 7/1907 | Lockwood | .............. | F16C 33/46 |
| | | | | | | 384/573 |
| 1,966,266 | A | * | 7/1934 | Skelly | ................ | F16C 33/4682 |
| | | | | | | 384/573 |
| 3,194,612 | A | * | 7/1965 | Striepe | ................ | F16C 29/0619 |
| | | | | | | 384/44 |
| 4,961,651 | A | * | 10/1990 | Rabe | ....................... | F16C 33/50 |
| | | | | | | 384/51 |
| 2004/0213485 | A1 | * | 10/2004 | Kato | ................... | F16C 29/0609 |
| | | | | | | 384/45 |
| 2007/0230837 | A1 | * | 10/2007 | Chen | ..................... | F16C 29/041 |
| | | | | | | 384/51 |

(Continued)

FOREIGN PATENT DOCUMENTS

| EP | 0016880 A1 | 10/1980 | |
| EP | 3018372 A1 | 5/2016 | |
| JP | 2011106605 A | * 6/2011 | ............ F16C 19/463 |

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

An assembly for a rolling element bearing, the assembly including a first cage segment and a second cage segment which are releasably connectable to one another, and at least one rolling element. The assembly further comprises a cage pocket for receiving the at least one rolling element. The cage pocket is at least partly defined by a cage pocket wall of at least one of the first cage segment and the second cage segment. The assembly is such that, when the at least one rolling element is in the cage pocket, the at least one rolling element prevents the first cage segment and the second cage segment from being releasably disengaged. A rolling element bearing can incorporate such an assembly.

19 Claims, 4 Drawing Sheets

(56) References Cited

U.S. PATENT DOCUMENTS

| | | | |
|---|---|---|---|
| 2015/0063738 A1* | 3/2015 | Fox | F16C 43/04 |
| | | | 384/573 |
| 2017/0356495 A1* | 12/2017 | Breeze | F16C 19/26 |

* cited by examiner

ASSEMBLY FOR A ROLLING ELEMENT BEARING

CROSS-REFERENCE

This application claims priority to German patent application no. 102017217810.8 filed on Oct. 6, 2017, the contents of which are fully incorporated herein by reference.

FIELD OF THE PRESENT INVENTION

The present invention relates to an assembly for a rolling element bearing which comprises a first and a second cage segment and at least one rolling element. In addition, the present invention relates to a rolling element bearing comprising such an assembly.

BACKGROUND

Rolling element bearings are well known mechanical components which are used for rotatably supporting e.g. shafts or axles of a rotating application. There are different types of rolling element bearings, comprising rollers and/or balls as the rolling elements.

A typical rolling bearing comprises two bearing rings and rolling elements interposed in-between the two bearing rings. Additionally, it is common to separate the rolling elements in the bearing by a cage, also known as a retainer. A cage may be designed as a one-piece component comprising for example two rings and separating bars in-between the two bearing rings which together forms pockets for retaining the rolling elements. As an alternative, the rolling elements in a bearing may be separated by individual spacers between adjacent rolling elements. One such spacer design is for example known in EP 3 018 372 A1.

BRIEF SUMMARY OF THE PRESENT INVENTION

In view of the above, an object of the present invention is to provide an improved assembly for a rolling element bearing, or at least to provide a good alternative. Additionally, an object of the present invention is to provide an improved rolling element bearing comprising such an assembly.

The objects are achieved by the subject matter as specified in the independent claims. Preferred embodiments of the invention can be found in the dependent claims and in the accompanying description.

According to a first aspect, the object is achieved by an assembly for a rolling element bearing, which assembly comprises a first and a second cage segment which are releasably connectable to one another, and at least one rolling element. The assembly further comprises a cage pocket for receiving the at least one rolling element, which cage pocket is at least partly defined by a cage pocket wall of at least one of the first cage segment and the second cage segment. The assembly is such that; when the at least one rolling element is in the cage pocket, the at least one rolling element prevents the first cage segment and the second cage segments from being releasably disengaged.

Optionally, the assembly may further be such that; when the at least one rolling element, or any other similar object, is not in the cage pocket, the first cage segment and the second cage segments can be releasably disengaged.

By the provision of the present invention, a more flexible design is accomplished, which combines advantages of different previously known designs, and also at least partly alleviates disadvantages of the prior art designs. More particularly, the inventor has realized that it would be advantageous to build an assembly of separate cage segments and interlock them by making use of rolling elements which are placed in-between the respective segments. Thereby a complete cage for a rolling element bearing can be built by linking the separate cage segments, which also cannot be releasably disengaged once a rolling element is placed in-between the respective segments.

Separate segments with the above configuration may lead to a reduced manufacturing cost for the rolling bearings. For example, instead of producing one-piece cages in different sizes (specific diameters, widths etc.), the present invention results in that cages of different diameters can be built by using the same type of cage segments and then select the appropriate number of segments to thereby reach the desired cage diameter. Therefore, an increased flexibility and thus a reduced cost may be achieved.

In addition, rolling bearings with individual spacers, as known in the prior art, have limited speed capability compared to a rolling bearing with a traditional cage. This is due to that the spacers may be wedged between the rolling elements due to centrifugal forces, which in turn may lead to high and unwanted contact forces between the guiding surfaces of the spacers and the rolling elements. By connecting cage segments according to the present invention, the centrifugal forces may instead be carried by the segments themselves.

Still further, an advantage of the present invention is that by using the rolling elements as locking elements for the cage segments, no other separate parts are needed for the rolling bearing, such as additional screws, pins etc. Thereby a more cost-efficient design may be realized. Additionally, the risk that screws, pins etc. fall off during use can be eliminated.

Optionally, the first cage segment and the second cage segments may be adapted to be releasably disengaged by moving the first cage segment at least a first distance relative to the second cage segment, and when the at least one rolling element is in the cage pocket, the first cage segment is prevented from moving the first distance relative to the second cage segment. Thereby a facilitated assembly/disassembly of the segments may be accomplished. Still optionally, the first distance may be a distance which is essentially transverse to a rolling direction of the at least one rolling element when used in a rolling element bearing. Thereby it may be easier to assemble/disassemble the cage segments when placed in a rolling element bearing. In an embodiment, the transverse direction is an axial direction of a rolling element bearing. The axial direction of the bearing is the direction of the rotational axle of the rolling element bearing.

Optionally, the assembly may further comprise at least a first coupling for coupling the first cage segment to the second cage segment, which first coupling comprises a first and a second coupling member. Still optionally, the first cage segment and the second cage segments may be adapted to be releasably disengaged by moving the first coupling member at least a first distance relative to at least one of the cage segments, and when the at least one rolling element is in the cage pocket, the first coupling member is prevented from moving the first distance relative to the second cage segment.

Optionally, the assembly may further comprise at least a second coupling for coupling the first cage segment and the second cage segment, which second coupling comprises a third and a fourth coupling member. Thereby a more rigid coupling between the segments may be accomplished. Furthermore, according to another example embodiment, when the assembly comprises a first and at least a second coupling, a line connecting the first coupling and the second coupling extends through the cage pocket. This may even further provide an increased rigidity and connection between the segments. Still further, according to yet another example embodiment, the first coupling and the second coupling may be located on opposite or diagonally opposite sides of the cage pocket.

Optionally, at least the first coupling is a male/female connection. Thereby a facilitated way of connecting the two segments may be achieved.

Optionally, at least the first coupling member and the second coupling member form part of the respective first cage segment and the second cage segment. Thereby, fewer parts may be needed for the assembly.

Optionally, when the assembly comprises at least a first coupling, at least one of the first coupling member and the second coupling member is a locking element separate from the first cage segment and the second cage segment. A separate locking element may for example be a pin that interlocks the two segments. The at least one rolling element may prevent the pin from releasing its connection when the at least one rolling element is in the cage pocket, e.g. by preventing access to the locking element.

Optionally, the cage pocket may be defined by the first wall and by a second wall of the first cage segment, and further by at least a third wall of the second cage segment. Still further, according to another example embodiment, the cage pocket may be defined by the first wall and the second wall of the first cage segment, and further by at least the third and a fourth wall of the second cage segment. In yet a further embodiment, the four walls of the cage pocket enclose the at least one rolling element.

Optionally, the cage pocket may be defined by an essentially circular first wall of at least one of the cage segments.

Optionally, the first cage segment may comprise at least a coupling member for coupling a third segment on an opposite side to the second segment. Thereby more than two cage segments may be connected.

Optionally, the first cage segment and the second cage segment are of essentially similar shape. By providing essentially similar cage segments, manufacturing costs may be reduced.

Optionally, at least one of the first cage segment and the second cage segment may present a Z-, O- or L-shape form.

Optionally, at least one of the first cage segment and the second cage segment may be guided by the at least one rolling element and/or by anyone of the bearing rings of the rolling element bearing when the cage segment is in use in the bearing.

According to a second aspect, the object is achieved by a rolling element bearing comprising an assembly according to anyone of the embodiments of the first aspect of the present invention. It shall be noted that any embodiment of the second aspect of the invention is applicable and combinable to any of the embodiments of the first aspect of the invention and vice versa, unless it is specifically stated otherwise.

Optionally, the rolling element bearing may be a roller bearing or a ball bearing, such as a toroidal roller bearing, spherical roller bearing, cylindrical roller bearing, tapered roller bearing, deep-groove ball bearing, angular contact ball bearing, self-aligning ball bearing etc.

BRIEF DESCRIPTION OF THE DRAWINGS

Exemplifying and preferred embodiments of the present invention will now be described more in detail, with reference to the accompanying drawings, wherein.

Figure 1:
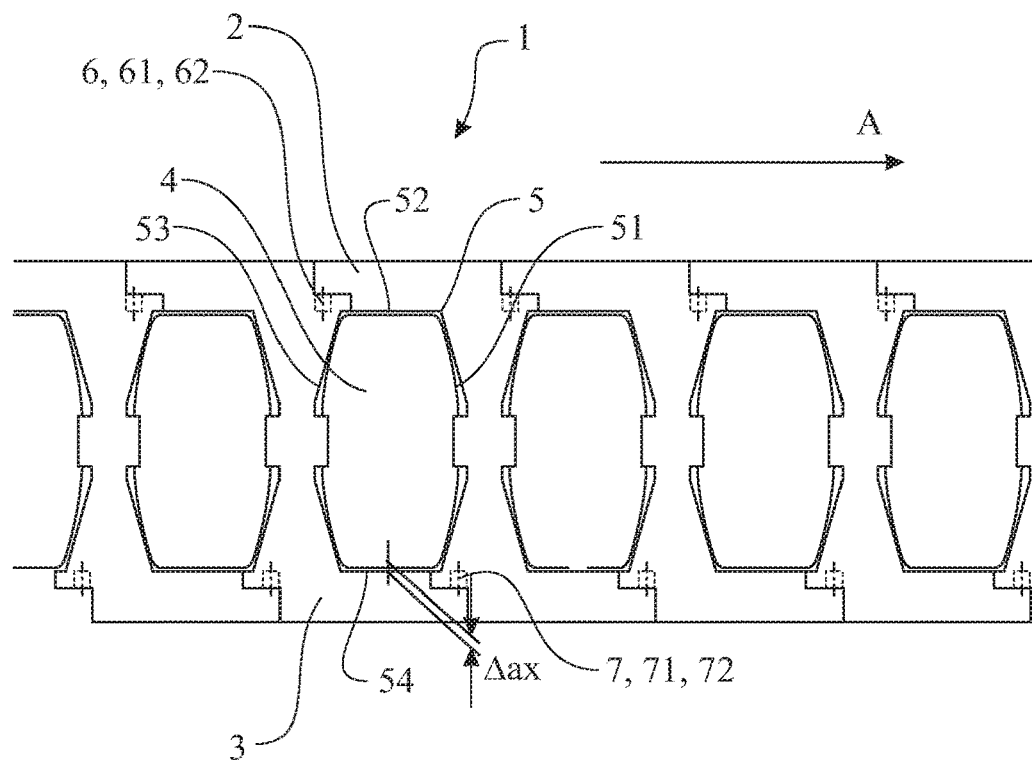
FIG. 1 presents a first exemplary embodiment of an assembly according to the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Throughout the detailed description, like reference numerals refer to like elements, unless explicitly expressed otherwise.

DETAILED DESCRIPTION

FIG. 1 illustrates an assembly 1 for a rolling element bearing (not shown) according to an example embodiment of the present invention. The assembly 1 comprises a first cage segment 2 and a second cage segment 3 which are releasably connectable to one another, and at least one rolling element 4 (which in this embodiment is a roller 4). In this embodiment, it can be seen that more than two cage segments are interconnected (i.e. a plurality of assemblies are shown), which may result in a complete cage for retaining the rolling elements 4 of a rolling bearing. A direction A as seen in the figure represents a rolling direction of the rollers 4. Due to that the components of each assembly 1 in this embodiment are essentially similar in shape; only one of the assemblies will be described and referred to in the following section.

The assembly 1 in FIG. 1 further comprises a cage pocket 5 for receiving the at least one roller 4, which cage pocket 5 is defined by a first cage pocket wall 51 of the first segment 2 and a second cage pocket wall 52 of the same segment 2, which walls are extending relative one another such that it results in an essentially L-shaped form. Additionally, the cage pocket 5 is further defined by a third cage pocket wall 53 and a fourth cage pocket wall 54 of the second cage segment 3, which also are extending relative one another such that it results in an essentially L-shaped form. The L-shaped walls 51, 52 and 53, 54, respectively, enclose the roller 4. The assembly 1 is arranged such that; when the at least one roller 4 is in the cage pocket 5, the at least one roller 4 prevents the first cage segment 2 and the second cage segment 3 from being releasably disengaged. Moreover, as exemplified in FIG. 2, when the at least one roller 4 is not in the cage pocket 5, the first cage segment 2 and the second cage segment 3 can be releasably disengaged. The engagement between the first segment 2 and the second segment 3 is in this example embodiment accomplished by a first and a second coupling, 6 and 7, respectively. The first coupling 6 comprises a first coupling member 61 and a second coupling member 62, respectively, and the second coupling 7 comprises a third coupling member 71 and a fourth coupling member 72, respectively. In this embodiment, the respective first, second and third, fourth coupling members are male/female connections. Additionally, in this embodiment, the first coupling 6 and the second coupling 7 are located along a line (not shown) which intersects the cage pocket 5 and the roller 4. More particularly, the first coupling 6 and the second coupling 7 are located on diagonally opposite sides of the cage pocket 5. This design is one preferred way of designing the cage segments 2 and 3 in order to achieve a reliable connection therebetween. Additionally, with the coupling configuration, the disengagement of the respective segments 2 and 3 will be performed at least in a direction which is essentially transverse to the rolling direction A. The roller 4 can prevent the segments 2 and 3 from being releasably disengaged due to that the first coupling and the second coupling are prevented from moving a distance L (see FIG. 2) which is larger than a distance Δax. The distance Δax is in this embodiment the play between the cage pocket 5 and the roller 4. More specifically, the at least one roller 4 prevents the first cage segment 2 and the second cage segment 3 from being releasably disengaged by engagement between a rolling surface of the at least one roller 4 and a surface or surfaces creating a peripheral wall defining the cage pocket 5. The play is the largest distance which the roller 4 can move in the cage pocket 5 before contacting any of the cage pocket walls. Further, in this embodiment, the distance Δax is an axial distance extending in the length extension of the roller element 4 and the cage pocket 5. The at least one rolling element 4 is assembled into the cage pocket 5 subsequent to the coupling of the first coupling member 61 and the second coupling member 62. The distance of play Δax between cage pocket 5 and the at least one roller 4 is less than the releasing distance L, thus preventing the at least one first coupling 6 joining the first cage segment 2 and the second cage segment 3 from being releasably disengaged.

The roller 4 is in this example a curve-shaped roller comprising a convex-shaped outer raceway surface, and may be suitable for e.g. a spherical roller bearing or a toroidal roller bearing. The roller 4 could also of course be any other kind of roller, such as a tapered or cylindrical roller for a tapered or cylindrical bearing.

Figure 2:
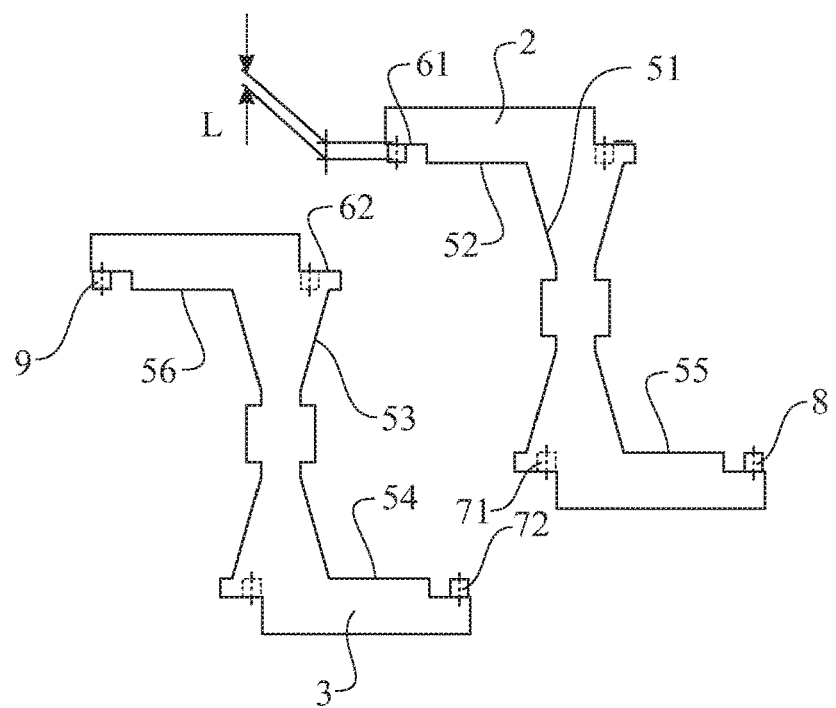
FIG. 2 presents a view of two separated cage segments as shown in FIG. 1.

Now turning to FIG. 2, the first cage segment 2 and the second cage segment 3 as presented in FIG. 1 can be seen, with the difference that the segments 2 and 3 here are disengaged. The segments 2 and 3 are otherwise the same as the ones already described in relation to FIG. 1. The first coupling member 61 of the first cage segment 2 is arranged such that it needs to move a distance L relative to the second coupling member 62 in order to be disengaged from the second coupling member 62 of the second cage segment 3. As can be seen, the coupling members are in this embodiment configured as male/female connections. Additionally, the first cage segment 2 comprises an additional fifth coupling member 8 for connecting to another cage segment (see FIG. 1) on the opposite side of the second cage segment 3. The additional fifth coupling member 8 is located on an additional pocket wall 55 which extends in the opposite direction to the first pocket wall 51; thereby the cage segment 2 resembles a Z-shape. Similarly, the second cage segment 3 comprises an additional sixth coupling member 9 for connecting to another cage segment (see FIG. 1) on the opposite side of the first cage segment 2. The additional sixth coupling member 9 is located on an additional pocket wall 56 which extends in the opposite direction to the fourth pocket wall 54; thereby the cage segment 3 also resembles a Z-shape. Due to the above mentioned design, it is possible to build a complete cage for a rolling element which comprises a plurality of Z-shaped cage segments.

Figure 3:
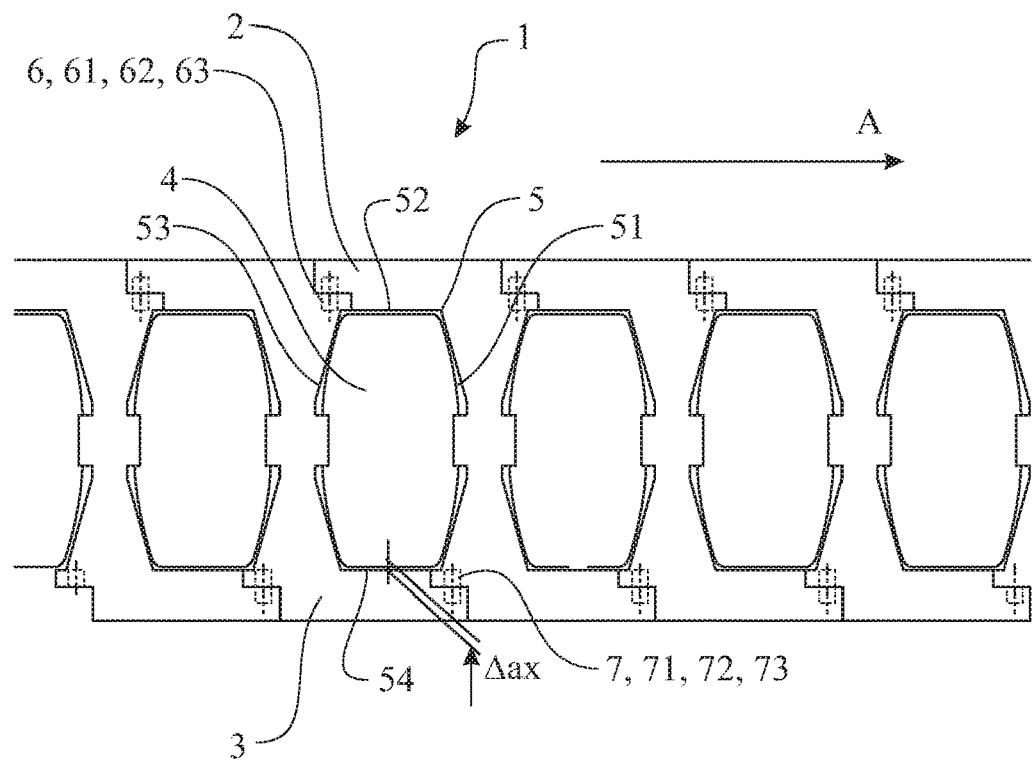
FIG. 3 presents a variant of the embodiment of the assembly originally introduced in FIG. 1.
Figure 4:
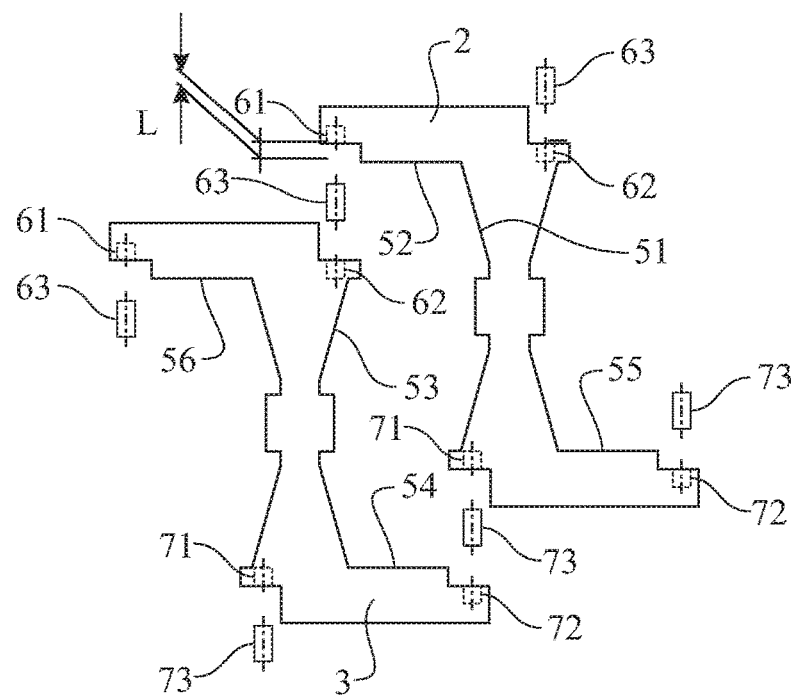
FIG. 4 presents a view of two separated cage segments as shown in FIG. 3.

In FIGS. 1 and 2, the first coupling member 61 includes a pin and the second coupling member 62 includes a bore. Similarly, the third coupling member 71 includes a pin and the fourth coupling member 72 includes a bore. FIGS. 3 and 4 present a variant of the assembly 1 of FIGS. 1 and 2, where the assembly 1 comprises at least a first coupling 6, including the first coupling member 61 and the second coupling member 62 assembled to one another by a locking element 63, wherein the locking element 63 is separate from the first cage segment and the second cage segment is a locking element 63 separate from the first cage segment 2 and the second cage segment 3. A separate locking element 63 may for example be a pin that interlocks the two segments 2, 3. The at least one rolling element may prevent the pin from releasing its connection when the at least one rolling element is in the cage pocket, e.g. by preventing access to the locking element 63.

Figure 5A:
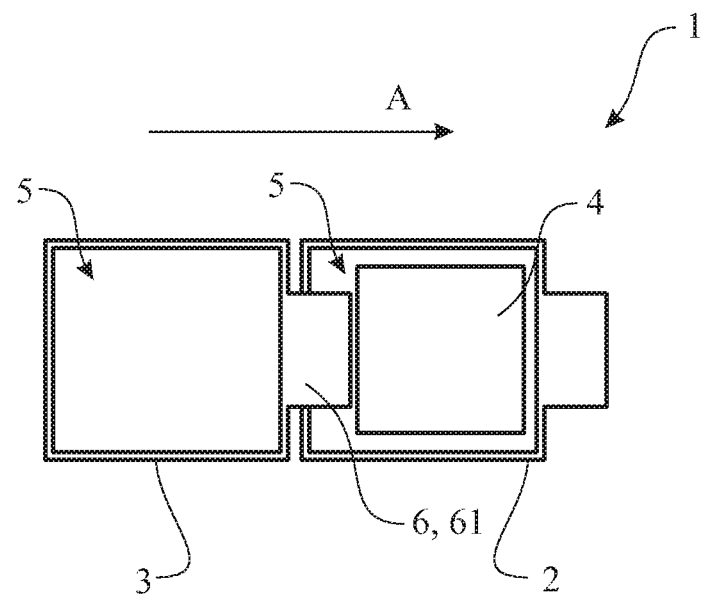
FIGS. 5A and 5B show another exemplary embodiment of an assembly.
Figure 5B:
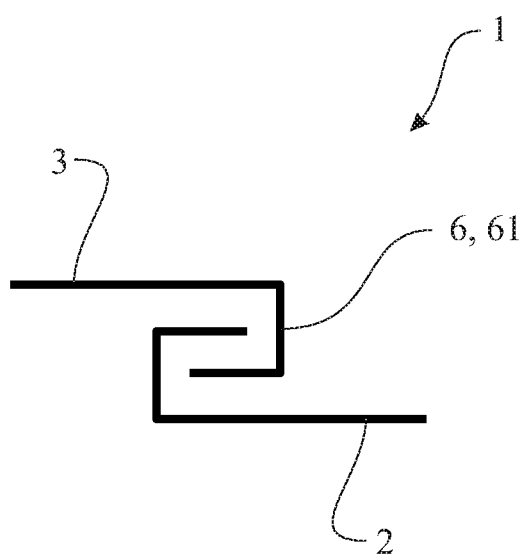
Figure 6:
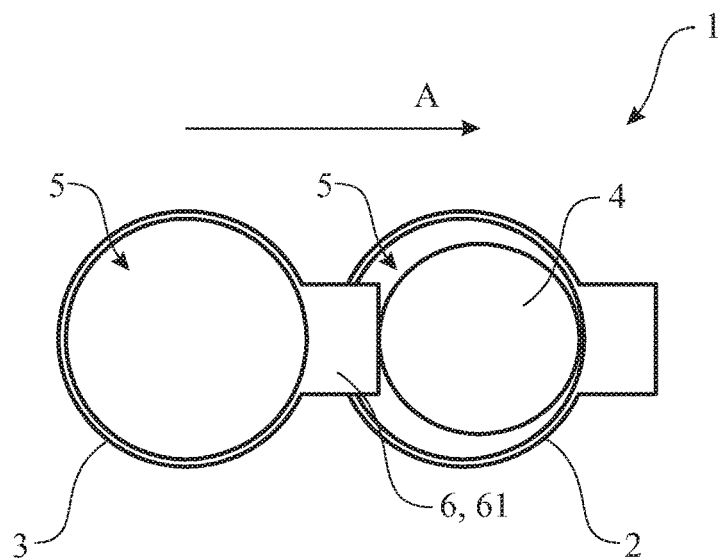
FIG. 6 presents yet another exemplary embodiment of an assembly.

In FIGS. 5A, 5B and 6, two other examples of embodiments according to the present invention can be seen. For both embodiments, the cage pockets 5 are defined by one or several walls of only one of the respective cage segments, 2 and 3. The assembly as shown in FIG. 5A is arranged such that; when the at least one roller 4 is in the cage pocket 5, the at least one roller 4 prevents the first cage segment 2 and the second cage segment 3 from being releasably disengaged; and, when the at least one roller 4 is not in the cage pocket 5, the first cage segment 2 and the second cage segment 3 can be releasably disengaged. Here, a first coupling member 61 of a coupling 6 is prevented by the roller 4 from moving a distance such that the first cage segment 2 and the second cage segment 3 can be released from one another. The disengagement is in these two embodiments performed by at least moving the segments 2 and 3 relative one another in a direction which is substantially parallel to the rolling direction A. The disengagement is in these two embodiments performed by at least moving the segments 2 and 3 relative one another in a direction which is substantially parallel to the rolling direction A. The play Δax of the roller 4 within the cage pocket 5 respective to the distance L required to release the coupling between the first cage segment 2 and the second cage segment 3 would function as previously described above.

FIG. 5B shows a side view of parts of the assembly 1 as shown in FIG. 5A (except for the roller 4). The side view is represented by a plane in the rolling direction A, which is perpendicular to the view as seen in FIG. 5A. Here, the coupling 6 comprises a male/female connection 6 which needs to move a specific distance to be releasably disengaged, wherein the roller 4 prevents the coupling from moving the specific distance when the roller is located in the cage pocket of the first cage segment 2.

FIG. 6 shows an embodiment which is similar to the one shown in FIGS. 5A and 5B, with the exception that the rolling element is instead a ball 4. Therefore, the cage pockets 5 are also somewhat different; especially the pocket 5 is essentially circle-formed instead of being more square-formed as in the embodiment shown in FIGS. 5A and 5B. The coupling 6 may be similar to the one shown in FIG. 5B.

Figure 7:
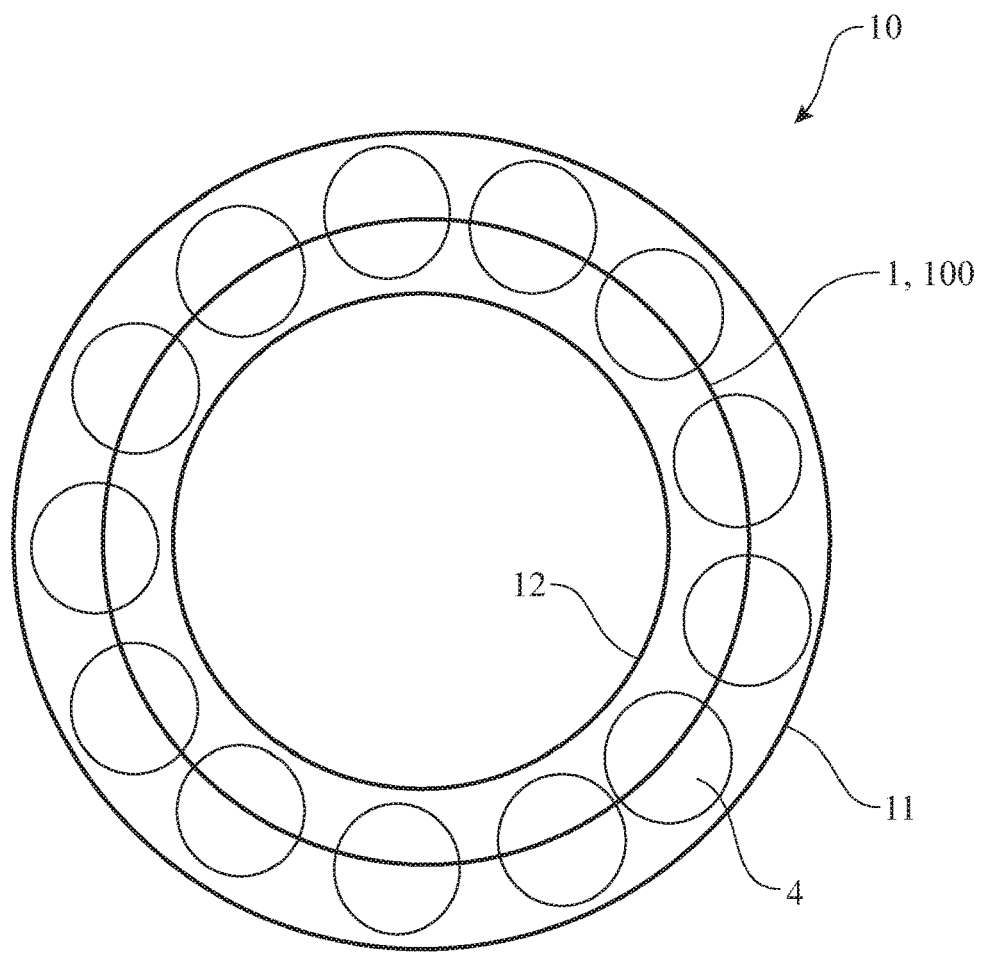
FIG. 7 presents an exemplary embodiment of a rolling element bearing.

FIG. 7 shows a rolling element bearing 10 in which an assembly 1 according to the present invention can be used for separating the rolling elements 4 therein. The assembly 1 is in this embodiment part of a complete cage 100 of the rolling element bearing, which cage 100 is built by a plurality of assemblies 1 according to anyone of the embodiments disclosed herein. The rolling bearing comprises an outer ring 11 and an inner ring 12 and a plurality of rolling elements 4 interposed in-between the respective rings 11 and 12. The rolling element bearing 10 may be any kind of rolling bearing as already explained hereinabove.

The invention is not limited to the embodiments described herein. It would be evident for the skilled person that other embodiments and modifications to the embodiments specified hereinabove are also possible within the scope of the claims. For example, and as also explained hereinabove, a coupling member does not necessarily need to be part of anyone of the two cage segments, but could also for instance be a separate locking member (such as a pin or the like) which is prevented from falling out from its locking position by a rolling element.

What is claimed is:

1. An assembly for a rolling element bearing, comprising:
   a first cage segment and a second cage segment being releasably connectable to one another by at least a first coupling, the first coupling requiring a minimum movement of a releasing distance to release the first coupling, the first coupling comprising a first coupling member and a second coupling member;
   at least one rolling element; and
   a cage pocket for receiving the at least one rolling element and being at least partly defined by a cage pocket wall of at least one of the first cage segment and the second cage segment,
   wherein, when the at least one rolling element is assembled into the cage pocket subsequent to the coupling of the first coupling member and the second coupling member, a distance of play between cage pocket and the at least one rolling element is less than the releasing distance, thus preventing the at least one first coupling joining the first cage segment and the second cage segment from being releasably disengaged; and
   wherein the first cage segment and the second cage segment are each Z-shaped.

2. The assembly according to claim 1, wherein the first cage segment and the second cage segment are adapted to be releasably disengaged by moving the first cage segment at least a first distance relative to the second cage segment, and
   when the at least one rolling element is in the cage pocket, the first cage segment is prevented from moving the first distance relative to the second cage segment.

3. The assembly according to claim 1,
   wherein the first cage segment comprises a first cage pocket wall and a second cage pocket wall,
   wherein the second cage segment comprises a third cage pocket wall and a fourth cage pocket wall; and
   wherein the cage pocket is formed by the first cage pocket wall, the second cage pocket wall, the third cage pocket wall, and the fourth cage pocket wall.

4. The assembly according to claim 3, further comprising at least a second coupling for coupling the first cage segment and the second cage segment, the second coupling further comprising a third coupling member and a fourth coupling member.

5. The assembly according to claim 4, wherein a line connecting the first coupling and the second coupling extends through the cage pocket.

6. The assembly according to claim 5, wherein the first coupling and the second coupling are located on one of opposite or diagonally opposite sides of the cage pocket.

7. The assembly according to claim 3, wherein at least the first coupling is a male/female connection.

8. The assembly according to claim 3, wherein at least the first coupling member and the second coupling member form part of the respective first cage segment and the second cage segment.

9. The assembly according to claim 3, wherein at least one of the first coupling member and second coupling member are assembled to one another by a locking element, wherein the locking element is separate from the first cage segment and the second cage segment.

10. A rolling element bearing comprising the assembly according to claim 3.

11. A rolling element bearing comprising the assembly according to claim 1.

12. The assembly according to claim 1, wherein the cage pocket is barrel shaped.

13. An assembly for a rolling element bearing, comprising:
    a first cage segment having a first coupling member and a second cage segment including a second coupling member, the first coupling member and the second coupling member being releasably connectable to one another forming a first coupling, the first coupling requiring a minimum movement of a releasing distance to release the first coupling;
    at least one rolling element; and
    a cage pocket for receiving the at least one rolling element and being at least partly defined by a cage pocket wall of at least one of the first cage segment and the second cage segment,
    wherein, when the at least one rolling element is assembled into the cage pocket subsequent to the coupling of the first coupling member and the second coupling member, a distance of play between cage pocket and the at least one rolling element is less than the releasing distance, thus preventing the at least one first coupling joining the first cage segment and the second cage segment from being releasably disengaged;
    wherein at least one of the first coupling member and the second coupling member is a hook.

14. The assembly according to claim 13, further comprising a second coupling including a first coupling member and a second coupling member, the first coupling member and the second coupling member of the second coupling being releasably connectable to one another forming the second coupling, the second coupling requiring a minimum movement of a releasing distance to release the first coupling.

15. The assembly according to claim 14, wherein the distance of play between cage pocket and the at least one rolling element is less than the second coupling.

16. The assembly according to claim 13, wherein at least the first coupling is a male/female connection.

17. The assembly according to claim 13, wherein at least one of the first coupling member and the second coupling member is a bore for receiving a pin.

18. The assembly according to claim 13, the first coupling further comprising a pin.

19. The assembly according to claim 13, wherein at least one of the first coupling member and second coupling member are assembled to one another by a locking element, wherein the locking element is separate from the first cage segment and the second cage segment.

\* \* \* \* \*